(12) United States Patent
Bell (10) Patent No.: US 10,533,635 B2
(45) Date of Patent: Jan. 14, 2020

(54) GEAR REDUCTION BOX FOR ELECTRIC MOTORCYCLES

(71) Applicant: Bell Custom Cycles LLC, Boulder City, NV (US)

(72) Inventor: Chris Bell, Boulder City, NV (US)

(73) Assignee: Bell Customs Cycles LLC, Boulder City, NV (US)

( * ) Notice: Subject to any disclaimer, the term of this patent is extended or adjusted under 35 U.S.C. 154(b) by 529 days.

(21) Appl. No.: 15/223,193

(22) Filed: Jul. 29, 2016

(65) Prior Publication Data

US 2018/0031078 A1 Feb. 1, 2018

(51) Int. Cl.
| | |
|---|---|
| *F16H 1/20* | (2006.01) |
| *F16H 57/029* | (2012.01) |
| *F16H 57/021* | (2012.01) |
| *B62M 11/02* | (2006.01) |
| *B62M 9/02* | (2006.01) |
| *F16H 7/06* | (2006.01) |

(52) U.S. Cl.
CPC ............... *F16H 1/20* (2013.01); *B62M 9/02* (2013.01); *B62M 11/02* (2013.01); *F16H 7/06* (2013.01); *F16H 57/021* (2013.01); *F16H 57/029* (2013.01)

(58) Field of Classification Search
CPC . F16H 1/20; F16H 7/06; F16H 57/021; F16H 57/029; B62M 11/02
See application file for complete search history.

(56) References Cited

U.S. PATENT DOCUMENTS

| | | | |
|---|---|---|---|
| 3,770,074 A | 11/1973 | Sherman | |
| 7,185,726 B2 | 3/2007 | Young | |
| 7,303,502 B2 | 7/2007 | Thompson | |
| 7,493,992 B2 * | 2/2009 | Rogers | F16D 55/38 180/343 |
| 8,028,785 B2 | 10/2011 | Kanno | |
| 8,439,152 B2 * | 5/2013 | Visscher | B60K 17/342 180/444 |
| 8,751,123 B2 | 6/2014 | Zenno | |
| 8,826,762 B2 | 9/2014 | Matsuda | |
| 8,915,818 B2 * | 12/2014 | Gunji | B60K 1/02 180/372 |
| 8,936,129 B2 * | 1/2015 | Honda | B62K 11/10 180/220 |
| 9,004,034 B2 | 4/2015 | Billot | |
| 9,315,231 B2 | 4/2016 | Gingl | |
| 9,580,129 B2 * | 2/2017 | Francis | B62J 99/00 |
| 9,802,556 B2 * | 10/2017 | Tanaka | B60K 1/04 |
| 2006/0180363 A1 * | 8/2006 | Uchisasai | B60K 6/48 180/65.275 |
| 2007/0213171 A1 | 9/2007 | Pizzichil | |

\* cited by examiner

*Primary Examiner* — David M Fenstermacher
(74) *Attorney, Agent, or Firm* — Muskin and Farmer LLC (57) ABSTRACT

A gear reduction unit for use particularly in an electric motorcycle. The gear reduction unit uses three adjacent gears. The three gears are straight cut gears, which make a sound when they turn together. The sound provides audio feedback so that bystanders can hear when the motorcycle is approaching, notwithstanding that the electric motor on the motorcycle is mostly silent.

20 Claims, 8 Drawing Sheets

GEAR REDUCTION BOX FOR ELECTRIC MOTORCYCLES

BACKGROUND OF THE INVENTION

Field of the Invention

The present general inventive concept is directed to a method, apparatus, and computer readable storage medium directed to a gear reduction box for use with an electric motorcycle.

Description of the Related Art

Combustion engines make a recognizable sound when operated. Thus, the typical motorcycle driven by a combustion engine generates a recognizable "motorcycle" sound to the operator of the motorcycle as well as bystanders.

Electric motorcycles (a motorcycle driven by an electric motor and battery instead of a combustion engine) are very quiet due to the quiet operation of electric motors. This can be disadvantageous for numerous reasons. Riders of electronic motorcycles may miss the "motorcycle" sound when riding. Electronic motorcycles may also be hazardous in that bystanders may not hear one approaching thus making them harder to avoid when crossing streets.

SUMMARY OF THE INVENTION

It is an aspect of the present invention to provide an improved gear reduction unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

The present inventive concept relates to a gear reduction unit (or "gear box") for use with an electric motorcycle (a motorcycle powered by an electric, not combustion, engine). While electric motors themselves do not make very much noise, the gear box is designed to give audio feedback which changes pitch, volume, and tone at different speeds.

Figure 1:
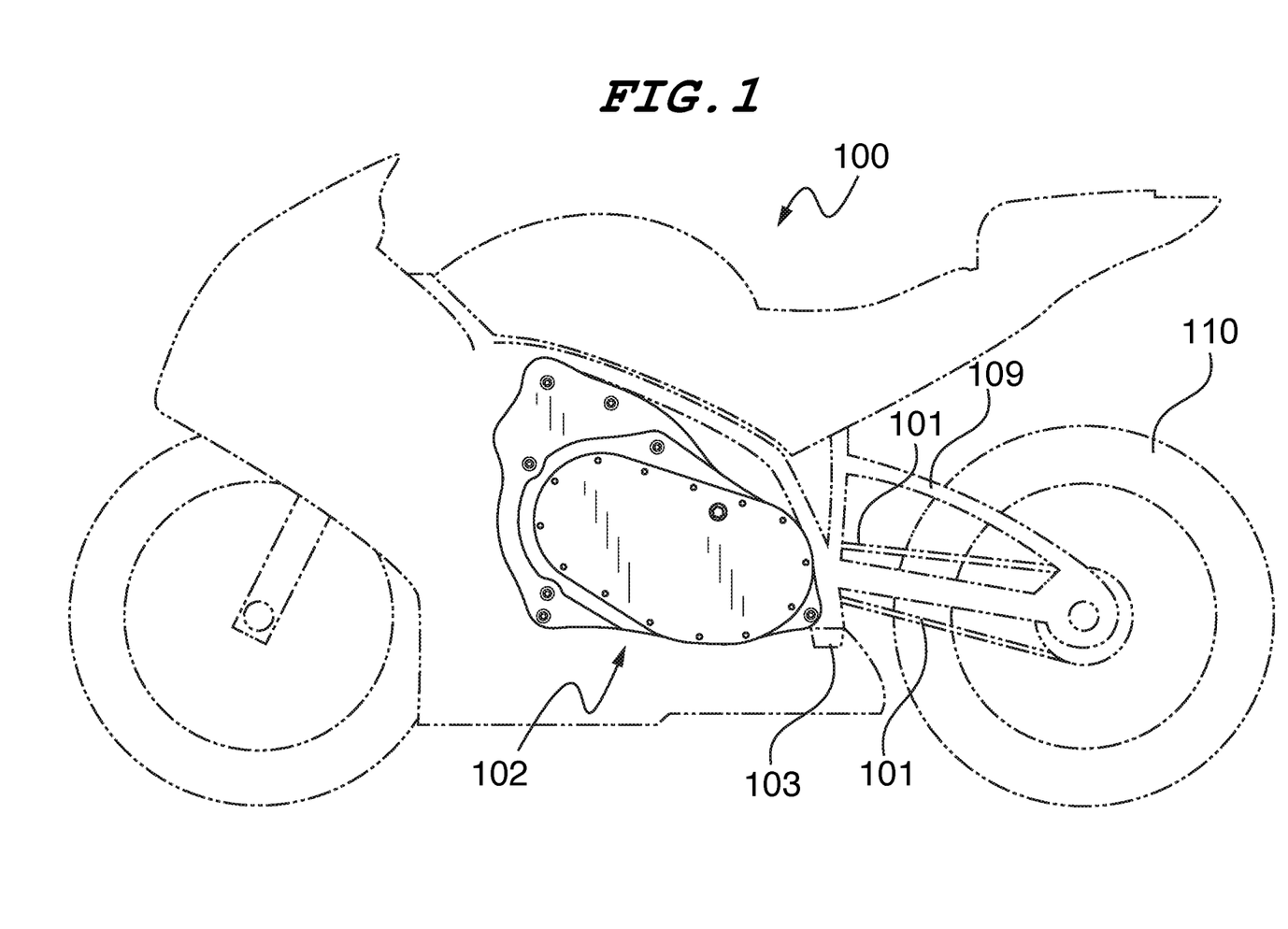
FIG. 1 is a drawing of an entire electric motorcycle, according to an embodiment.

FIG. 1 is a drawing of an entire electric motorcycle, according to an embodiment.

An electric motorcycle 100 is shown which has a gear box 102, a chain 101, and a foot rest 103. The gear box will receive power from an electronic motor and output that power to the chain 101. The electric motorcycle has a motorcycle frame 109 and a rear wheel 110. The electric motorcycle 100 can be a BRUTUS ELECTRIC MOTORCYCLE or any other kind.

Aside from the fact that the electric motorcycle uses an electric motor, gear box, and chain configuration as described herein, the electric motorcycle otherwise operates and is structured as a standard combustion driven motorcycle. Note that an electric motorcycle does not need a transmission because electric motors generate all of their torque at low speeds.

Figure 2:
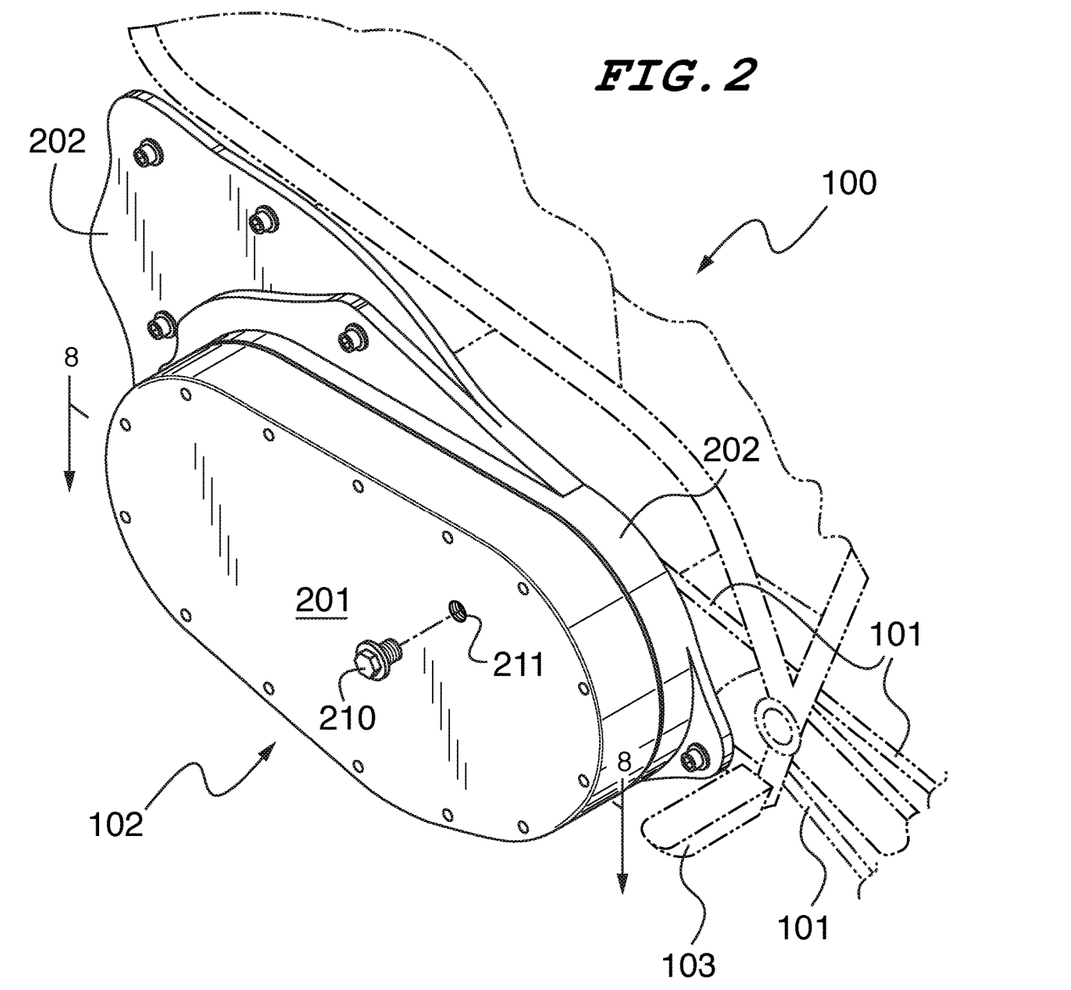
FIG. 2 is a drawing of a gear box mounted to the electric motorcycle, according to an embodiment.

FIG. 2 is a drawing of a gear box mounted to the electric motorcycle, according to an embodiment.

The gear box 102 comprises a cover plate 201 attached to a main body 202. The main body 202 is attached to the motorcycle 100. Fill bolt 210 (through a washer) is screwed into a gear oil level check hole 211. When fill bolt 210 is removed, the oil level can be checked through the gear oil level check hole 211 (also referred to as "check hole"). When the fill bolt 210 is removed, if oil leaks out of the hole 211 then the gear box does not need more oil. If no oil leaks out of the hole 211, then oil should be added to the hole 211 until it leaks out.

Figure 3:
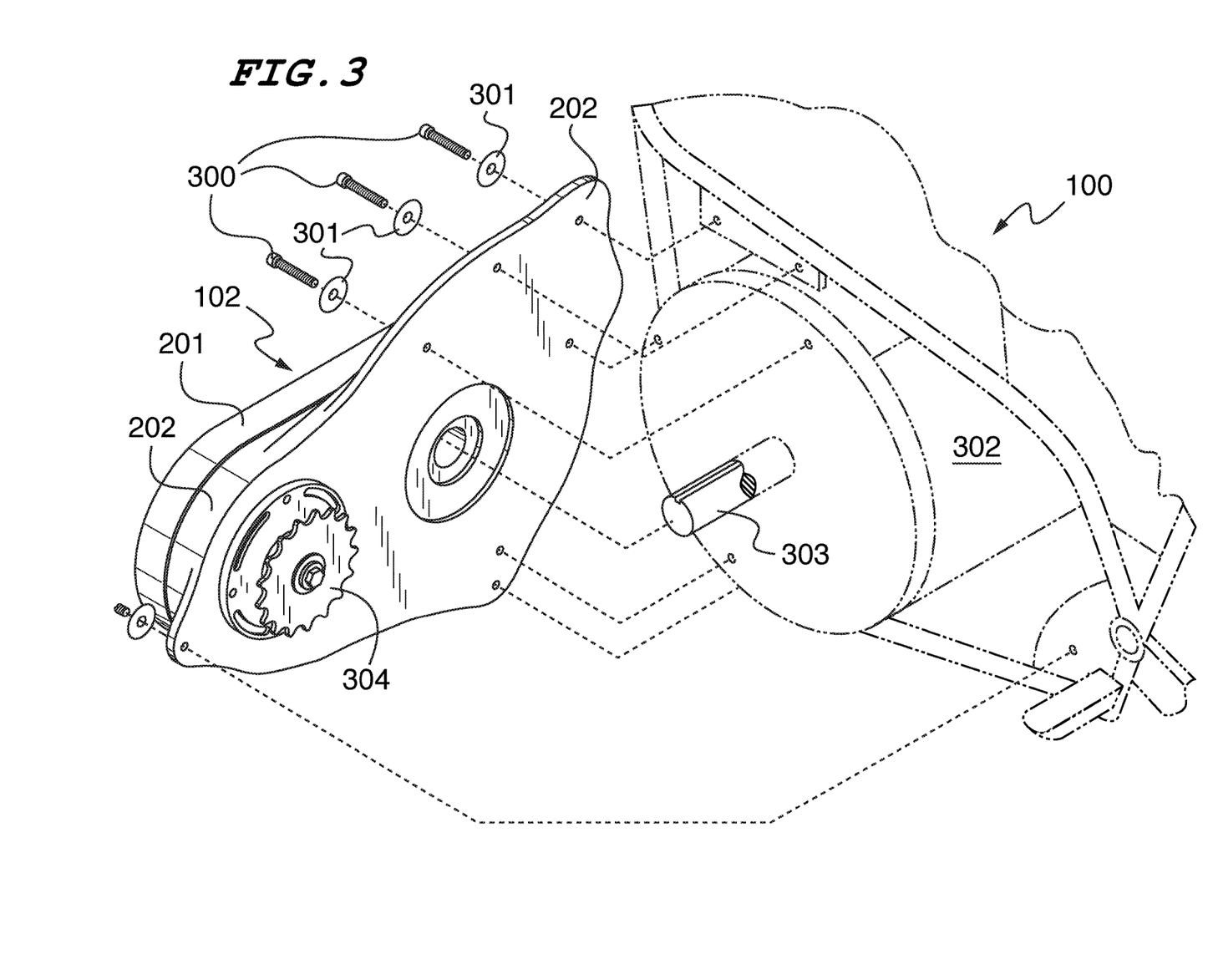
FIG. 3 is a drawing showing how the gear box is mounted onto the electric motorcycle, according to an embodiment.

FIG. 3 is a drawing showing how the gear box is mounted onto the electric motorcycle, according to an embodiment.

An electric motor 302 is mounted to the motorcycle 100. The electric motor 302 drives (turns) a motor shaft 303. Note that the power (rotation) input to the motor shaft 303 will pass through the gear box (as described herein) and is output to a sprocket 304 which has a chain mounted on it.

Bolts 300 pass through washers 301 which attach the main body 202 to the motorcycle 100 and the electric motor 302 (nuts on the opposite side which seal the bolts 300 are not shown).

Figure 4:
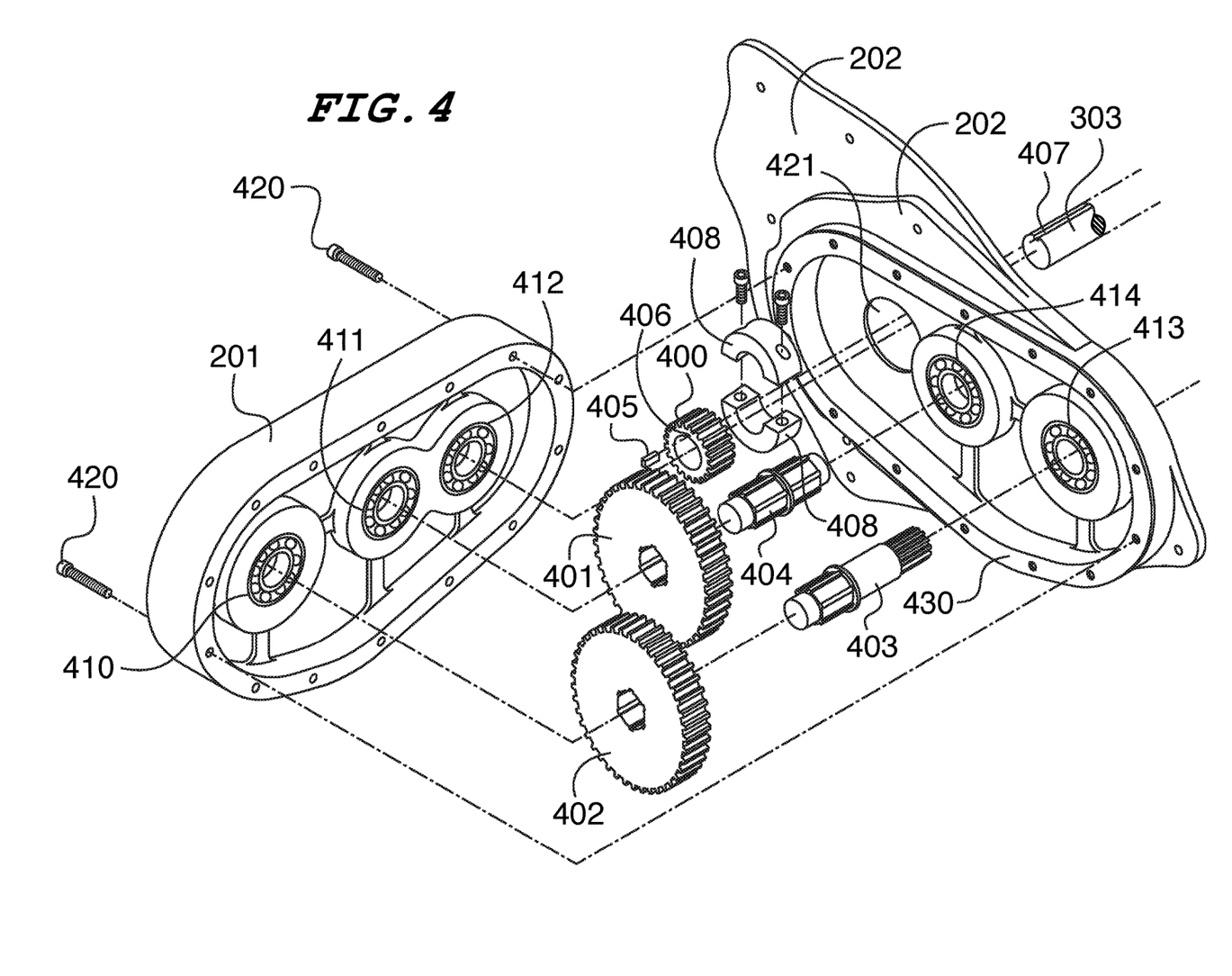
FIG. 4 is a drawing showing the inside of the gear box, according to an embodiment.

FIG. 4 is a drawing showing the inside of the gear box, according to an embodiment.

The cover plate 201 is connected to the main body 202 via bolts 420 (while only two such bolts are illustrated there are many such bolts 420 which are used in the holes around the perimeter of the cover plate 201 and the main body 202). The cooperating nuts sealing the bolts 420 are not shown.

The motor shaft 303 passes through a motor gear 400 and attaches inside a third outer bearing 412 (e.g., a ball bearing or other such bearing). All bearings described herein can be ball bearings or other suitable bearings. The motor shaft 303 has a key seat 407 which is a notch through the motor shaft 303 which is adapted to snugly receive a key 405. The motor gear 400 has a keyway 406 which is also adapted to snugly receive the key 405. Thus, when assembled, the key 405 fits inside the key seat 407 and the keyway 406 which serves to firmly connect the motor shaft 303 through the motor gear 400 (and hence the motor shaft 303 turns the motor gear 400). A keyway shaft clamp 408 (has two halves) fits inside a hole 421 which allows the motor shaft 303 to pass therethrough.

A first end of an idle shaft 404 fits inside a second inner bearing 414. The idle shaft 414 fits through (and turns) an idle gear 401. A second end of the idle shaft 404 (opposite the first end) fits inside a second outer bearing 411.

A first end of an output shaft 403 fits inside a first inner bearing 413. The output shaft 403 fits through (and turns) an output gear 402. A second end of the output shaft 403 (opposite the first end) fits inside a first outer bearing 410.

All bearings herein (e.g., the first inner bearing 413, the second inner bearing 414, the first outer bearing 410, the second outer bearing 411, the third outer bearing 412) can be ball bearings or any other suitable type of bearing.

Also shown in FIG. 4 is a gasket 430 that fits between the cover plate 201 and the main body 202. The gasket 430 can be made out of rubber and cushions the seal between the cover plate 201 and the main body 202 preventing a metal to metal seal.

Figure 5:
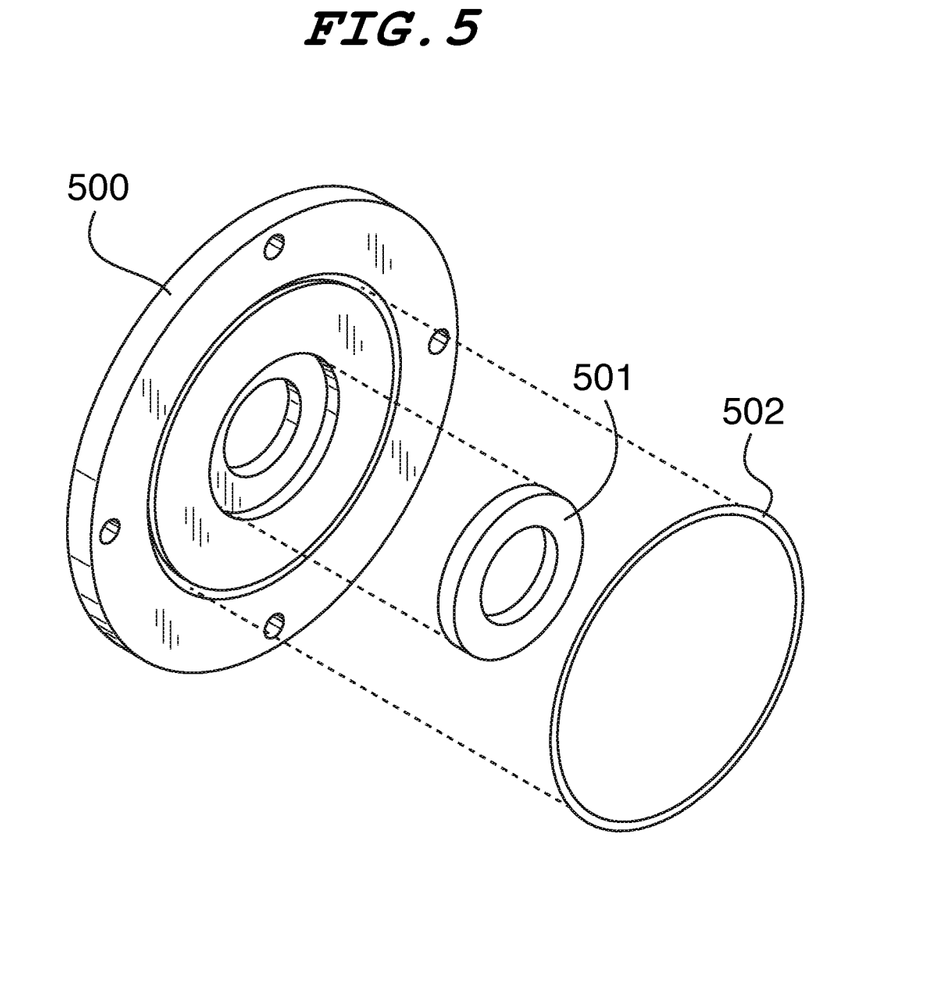
FIG. 5 is a drawing showing a shaft seal plate, according to an embodiment.

FIG. 5 is a drawing showing a shaft seal plate, according to an embodiment.

A shaft seal plate 500 has a shaft seal 501 and an O-ring seal 502. The seals (e.g., shaft seal 501, O-ring seal 502) can be made of rubber and serve to seal the shaft seal plate so no fluid (such as oil) leaks therethrough. The seals fit in respective notches in the round cover plate.

Figure 6:
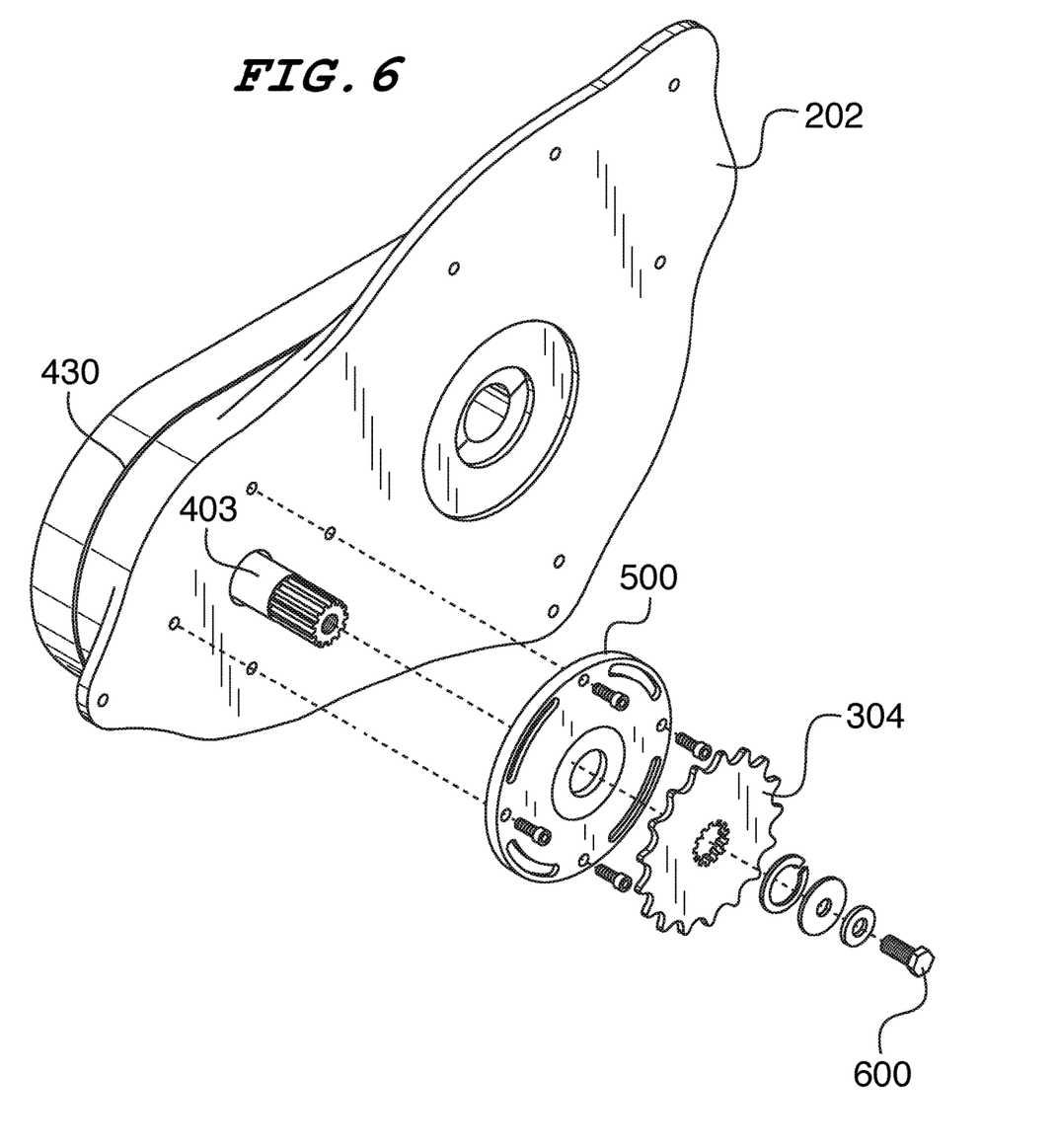
FIG. 6 is a drawing showing how a sprocket is mounted, according to an embodiment.

FIG. 6 is a drawing showing how a sprocket is mounted, according to an embodiment.

The first end of the output shaft 403 fits through the shaft seal plate 500. Note that in FIG. 6 the opposite side of the shaft seal plate 500 is shown from the side shown in FIG. 5. The shaft seal plate 500 is attached directly to the main body 202 using four screws (or bolts). The sprocket 304 fits onto the first end of the output shaft 403 but cannot pass past where teeth on the first end of the output shaft 403 end. A bolt 600 (or screw) fits through one or more washers, through the sprocket, through the shaft seal plate 500, and screws into the first end of the output shaft 403 thereby completing a sprocket assembly. In other words, the sprocket 304 fits tightly onto the first end of the output shaft 403. Thus, when the output shaft 403 turns, it turns the sprocket 304.

Figure 7:
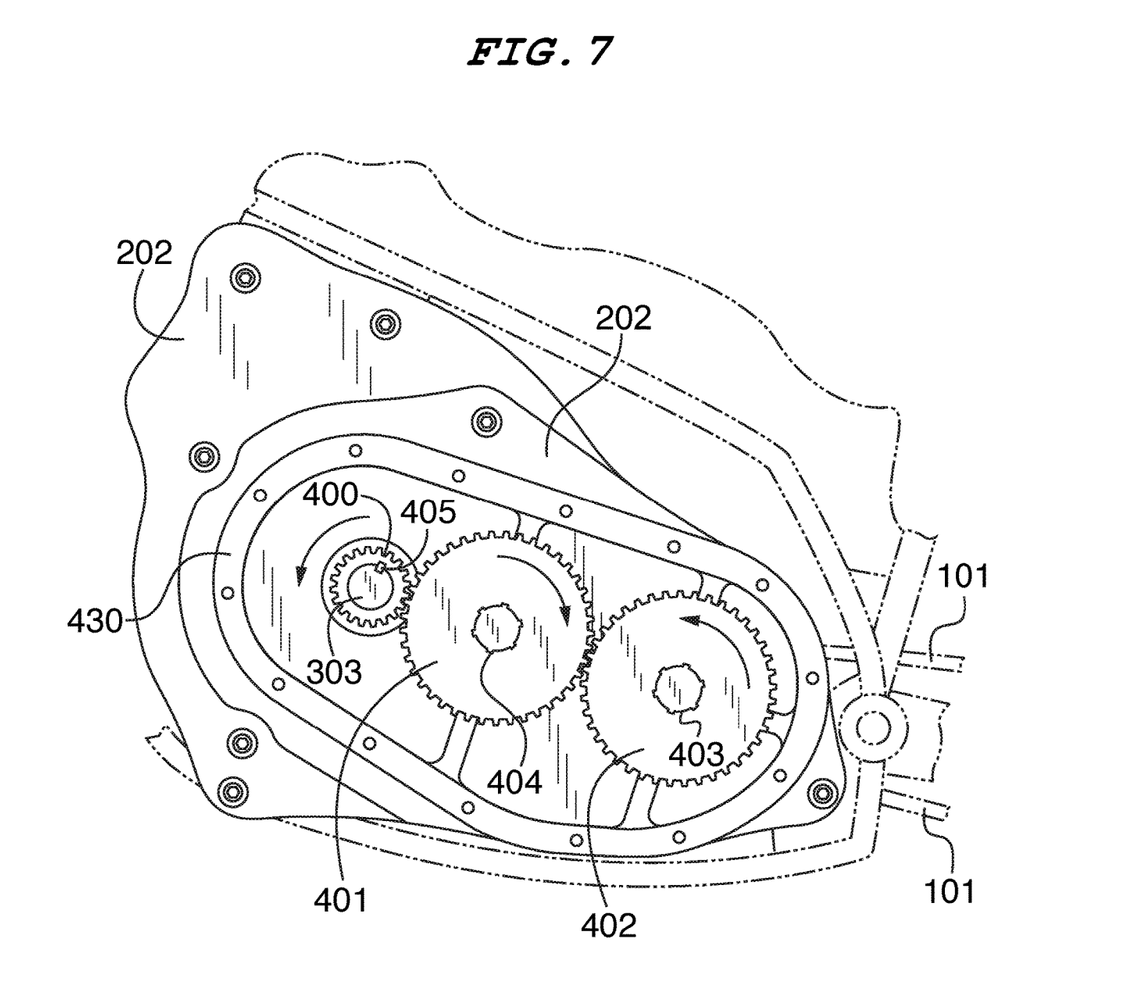
FIG. 7 is a drawing showing the rotation of gears inside the gear box, according to an embodiment.

FIG. 7 is a drawing showing the rotation of gears inside the gear box, according to an embodiment.

The gear box operates as follows. The motor shaft 303 turns the motor gear 400. The motor gear 400 turns the idle gear 401 (hence turning the idle shaft 404). The idle gear 401 turns the output gear 402 (hence turning the output shaft 403). Note that all of the gears in the gear box (the motor gear 400, the idle gear 401, the output gear 402) are all straight cut gears (as opposed to helical gears). The straight cut gears provide for an enhanced audio feedback (vs. using helical cut gears).

The output shaft 403 turns the sprocket (not visible in FIG. 7) which turns the chain 101 which propels the motorcycle 100. Note that all three gears are adjacent to each other and in communication with each other, in other words one gear cannot turn without turning its neighbor(s).

Note that in an embodiment, the motor gear 400 can have a diameter of 2 and 5/16 inches, the idle gear 401 has a diameter of 4.25 inches, and the output gear 402 has a diameter of 4.25 inches. The motor gear 400 can have 20 teeth, the idle gear 401 can have 41 teeth, and the output gear 402 can have 41 teeth. Note that the idle shaft 404 can be 6 spline which fits into the idle gear 401 which can also be a corresponding 6 spline and hence the configuration of both enables a tight fit. The output shaft 403 can be 6 spline which fits into the output gear 402 which can also be a corresponding 6 spline and hence the configuration of both enables a tight fit. The opposite side of the output shaft 403 that fits onto the sprocket 304 can be 13 spline (which fits onto a corresponding 13 spline sprocket 304).

Note that there are two different sizes of bearings used. A small bearing is 2 and 1/16 inches in diameter and has a center hole 3/4 inches in diameter. A large bearing is 2.5 inches in diameter and has a center hole 1 1/8 inches in diameter. The small bearing is used on both sides of the idle shaft 404 (the second outer bearing 411 and the second inner bearing 414) and on the cover plate 201 side of the output shaft 403. The large bearing is used on the main body 202 side of the output shaft 403 and the cover plate 201 side of the motor shaft 303. The center holes on both bearing types (the small bearing and the large bearing) allow for a slip fit on their respective shafts. Note that "small" and "large" are relative terms and basically refer to the large bearing being larger in diameter than the small bearing, but otherwise any sizes can be used for the small bearing and large bearing no matter how large or small.

Note that the particular parameters described herein (e.g., gear diameters, number of teeth, bearing sizes, spline numbers, etc.) merely represent one example of an embodiment of the inventive concept, and one of ordinary skill in the art would appreciate that numerous different parameters of the parts (e.g., different sizes, etc.) can be applied to the inventive concept which can still achieve the advantages of the inventive concept.

Figure 8:
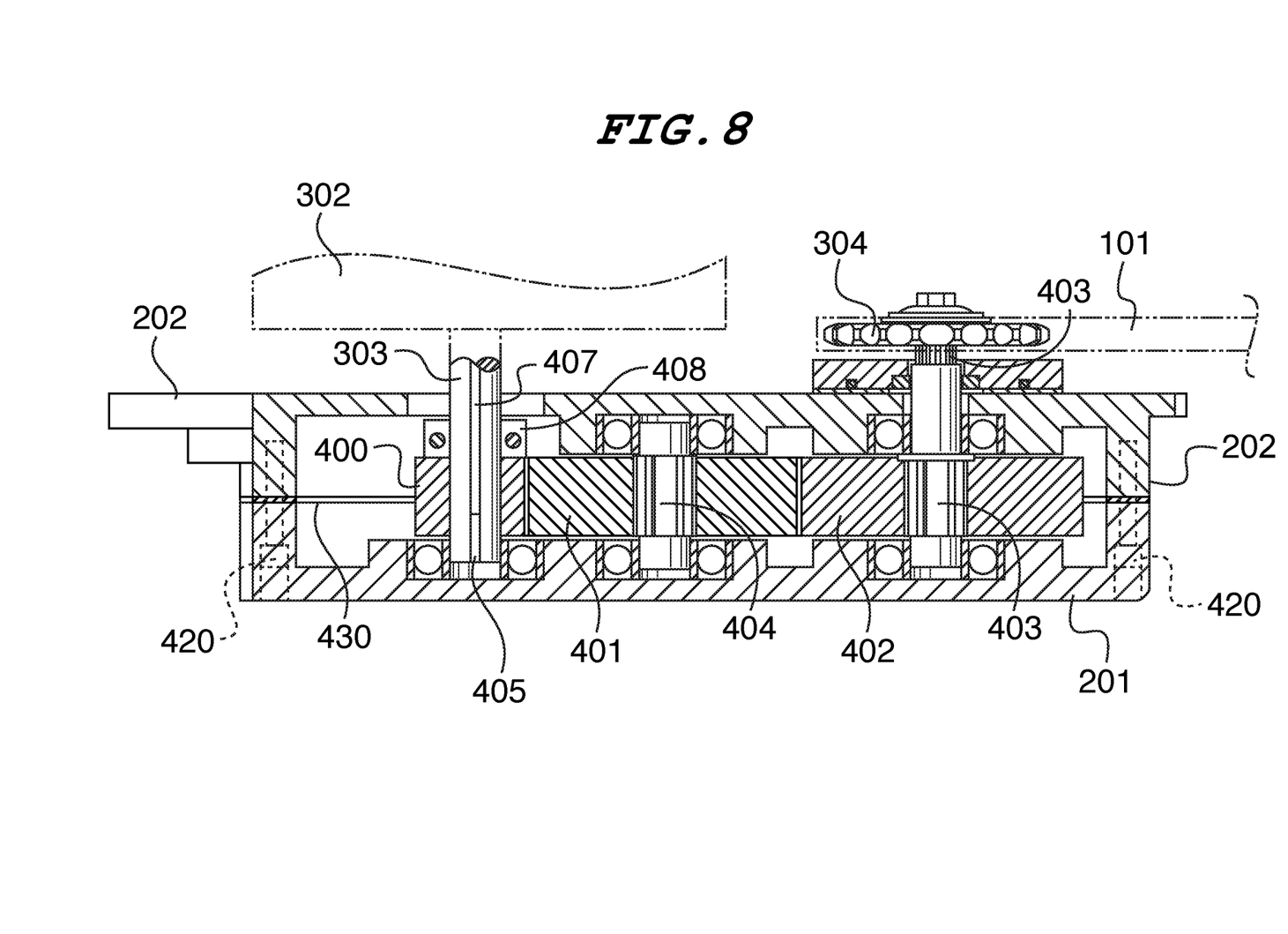
FIG. 8 is a drawing showing a cross sectional view from the section plane indicated in FIG. 2, according to an embodiment.

FIG. 8 is a drawing showing a cross section of the gear box from the view indicated in FIG. 2, according to an embodiment.

Note that the motor shaft 303 is parallel to the output shaft 403. Referring back to FIG. 2, because of the configuration of the gear box (including the motor shaft 303 and the output shaft 403), the chain 101 passes behind the foot rest 103. Therefore, there is little or no danger of the rider getting his/her foot caught in the chain since the chain is behind where the rider's legs and feet will be.

The chain 101 also connects to a final drive gear on the rear wheel 110 of the motorcycle, thereby turning the rear wheel when the sprocket 304 is rotated. Of course the sprocket 304 is rotated whenever the motor shaft 303 is rotated, although at different speeds.

Note that the connection between the sprocket 304 and the final drive gear on the rear wheel 110 takes advantage of being inboard and parallel to the motor for extra safety in the event of a chain break. Because the sprocket 304 is located where it is (inside the motorcycle frame 109 and away from the foot rest 103) the rider is much safer in the event of an incident or accident. The main body 202 itself acts as a chain guard when mounted to a motorcycle with rearset style footrest positioning. This eliminates the need for a special additional chain guard on a complete motorcycle which is required by DOT/NHTSA standards.

The gear box can give a gear reduction ratio of 2.05:1 (or any other ratio). The sealed unit can also use gear oil for lubrication and cooling, and the main body can also act as a heat sink for the electric motor. Any type of chain can be used, such as #520, #525, #530. With the addition of a standard adapter, the output shaft can be hooked up to a driveshaft, thus enabling the gear box to be used in other applications as well (e.g., cars, boats, watercraft, etc.)

The cover plate 201 and main body 202 can all be made of aluminum. All of the shafts and gears can be made of chromemoly steel. The bearings and seals are industry standard parts (e.g., bearings can be made out of metal or any other material standard bearings are made out of, and the seals can be made out of rubber or any other material standard seals are made out of). Although it can be appreciated, that any part described herein can be made out of any suitable material (e.g., steel, aluminum, any type of metal, plastic, rubber, etc., depending on the part.)

Note that the absence of a part from the figures does not imply that such part does not exist. For example, all bolts can have a cooperating nut which may or may not be shown. All bolts and screws can also have a washer. Any such construction which is standard in the art can be applied to all constructs described and/or illustrated herein whether explicitly illustrated/described or not. If any aspect of the invention is not shown in the figures, then common sense can be applied to determine the structure of the non-illustrated portion utilizing the description herein and/or what is commonly known in the art.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A gear box, comprising:
   a cover plate;
   a main body connected to the cover plate;
   a motor gear housed between the cover plate and the main body, the motor gear configured to receive a motor shaft, the motor shaft being driven by an electric motor which is part of an electric motorcycle;
   an idle gear housed between the cover plate and the main body, the idle gear being adjacent to the motor gear;
   an output gear housed between the cover plate and the main body, the output gear being adjacent to the idle gear; and
   an output shaft passing through the output gear.

2. The gear box as recited in claim 1, wherein the output shaft is parallel to the motor shaft.

3. The gear box as recited in claim 1, wherein the motor gear is smaller than the idle gear and the output gear.

4. The gear box as recited in claim 3, wherein the output gear and the idle gear are approximately a same size.

5. The gear box as recited in claim 1, wherein the output gear and the idle gear are approximately a same size.

6. The gear box as recited in claim 1, wherein the motor gear, the idle gear, and the output gear are all straight cut gears.

7. The gear box as recited in claim 1, wherein the output shaft is connected to a sprocket.

8. The gear box as recited in claim 7, further comprising a motorcycle and a chain, the chain connecting the sprocket and a rear wheel of the motorcycle, wherein the chain is located inside a frame of the motorcycle.

9. The gear box as recited in claim 1, wherein a gear reduction ratio of the gear box is approximately 2.05:1.

10. The gear box as recited in claim 1, wherein a gasket is located between the main body and the cover plate.

11. The gear box as recited in claim 1, further comprising a shaft seal plate adjacent to the main body and surrounding the output shaft.

12. The gear box as recited in claim 11, further comprising a shaft seal in the shaft seal plate.

13. The gear box as recited in claim 11, further comprising an O-ring seal in the shaft seal plate.

14. The gear box as recited in claim 1, further comprising a check hole through the cover plate and a bolt screwed into the check hole.

15. The gear box a recited in claim 1, further comprising an idle shaft passing through the idle gear.

16. The gear box as recited in claim 15, further comprising two idle shaft bearings each located on each end of the idle shaft.

17. The gear box as recited in claim 16, further comprising a cover side output shaft bearing located on an end of the output shaft towards the cover plate.

18. The gear box as recited in claim 17, further comprising a main body side output shaft bearing located on an end of the output shaft towards the main body.

19. The gear box as recited in claim 18, further comprising a motor shaft bearing located on an end of the motor shaft towards the cover plate.

20. The gear box as recited in claim 19, wherein the two idle shaft bearings and the cover side output shaft bearing are small bearings, and the main body side output shaft bearing and the motor shaft bearing are large bearings, the large bearings being larger in diameter than the small bearings.

\* \* \* \* \*